United States Patent [19]

Feldstein et al.

[11] Patent Number: 4,513,903

[45] Date of Patent: Apr. 30, 1985

[54] METHOD OF REPAIRING LEAKS IN STEAM GENERATOR TUBES

[75] Inventors: Joel G. Feldstein, North Canton, Ohio; James E. Gutzwiller, Jr., Forest, Va.

[73] Assignee: The Babcock & Wilcox Company, New Orleans, La.

[21] Appl. No.: 444,402

[22] Filed: Nov. 18, 1982

[30] Foreign Application Priority Data

Sep. 24, 1982 [US] United States ........ PCT/US82/01312

[51] Int. Cl.³ .............................................. B23K 20/08
[52] U.S. Cl. .................................... 228/107; 228/119; 228/2.5
[58] Field of Search ................ 228/2.5, 107, 108, 109, 228/119, 175; 29/402.09, 402.16; 138/97

[56] References Cited

U.S. PATENT DOCUMENTS

| | | | |
|---|---|---|---|
| Re. 30,802 | 11/1981 | Rogers | 29/402.09 |
| 3,912,148 | 10/1975 | Johnson | 228/107 |
| 4,028,789 | 6/1977 | Loch | 228/107 |
| 4,216,893 | 8/1980 | Glatthorn | 228/119 |

OTHER PUBLICATIONS

Olds, "Sleeving Saves Nuclear Steam Generator Tubes", *Power Engineering*, vol. 85, No. 12, (Dec. 1981) pp. 73–75.

*Primary Examiner*—Kenneth J. Ramsey
*Attorney, Agent, or Firm*—Robert J. Edwards; Robert C. Mai; J. Henry Muetterties

[57] ABSTRACT

A method of sealing leaking steam generator tubes without substantially restricting the fluid flow area by explosively welding a cylindrical sleeve over the degraded area of the tube. The sleeve has a wall thickness of approximately 0.010 to 0.040 inches and a length of about 1.5 to 4.0 inches, the weld occurs over the entire length of the sleeve.

2 Claims, 3 Drawing Figures

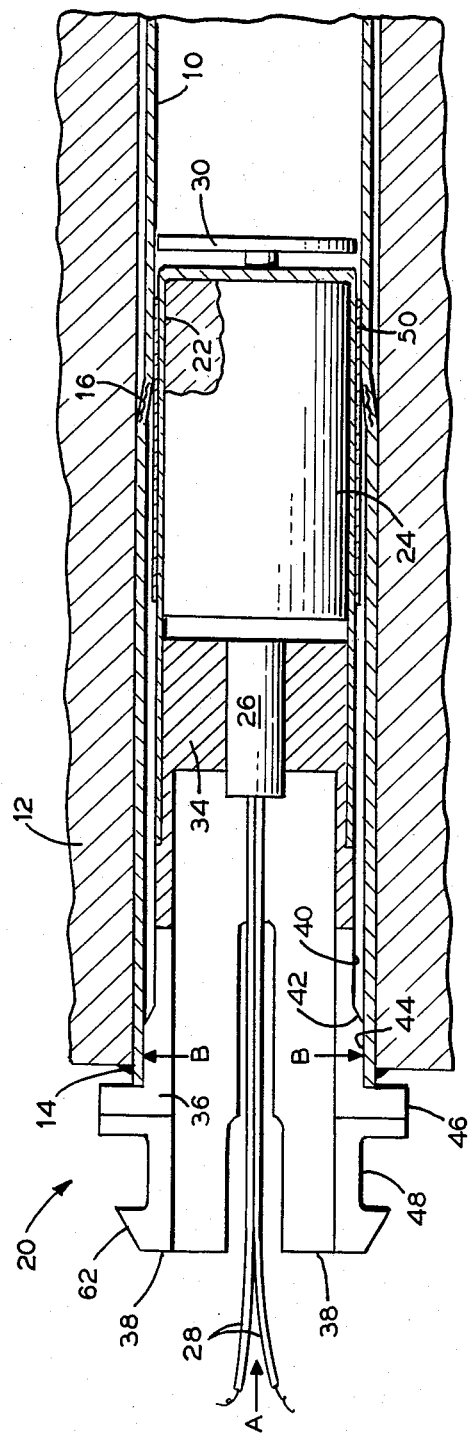

METHOD OF REPAIRING LEAKS IN STEAM GENERATOR TUBES

BACKGROUND AND SUMMARY OF THE INVENTION

This invention relates in general to the art of repairing leaking steam generator tubes and more particularly to an improved method of repair of damaged tubes by explosive welding.

In the operation of steam generators wherein heat transfer occurs between fluid passed through the tubes and fluid in contact with the outside of the tubes it sometimes becomes necessary to seal one or more leaks which occur in the tubes, in order to prevent mixing of the fluids. The sealing of the tubes in the past has generally been accomplished by means of expandable sleeves, expansion of the tube into the tubesheet, or by means of welded sealable sleeves or plugs depending on the pressure differential involved.

Ordinarily, where a high pressure steam generator or heat exchanger tube is to be sealed, a cylindrical sleeve is inserted into the bore of the tube, and a weld bead is deposited around the outside circumference of the joint between non defective region of the tube and the sleeve to form a pressure-tight seal. In many cases such tube sealing technique will be satisfactory, however, sometimes it has been found inadequate because fluid can penetrate along the tube sleeve interface and corrode through the weld bead thereby causing leakage. Moreover, in some heat exchangers, it is relatively difficult to seal weld sleeves using conventional equipment because of space limitations.

In the case of a low-pressure heat exchanger tube, the cylindrical sleeve is inserted into the bore of the tube and is either mechanically, hydraulically, or explosively expanded in order to create a mechanical seal between the sleeve and the tube. In most cases these seals tend to leak once the expanded areas have been exposed to several thermal cycles.

Repair of leaking defects in the tubesheet region of tubular heat exchangers has in the past been performed by mechanical, hydraulic or explosive expansion of the tube into the tubesheet at a location above (or below as the case may be) the defective area in order to isolate the leak from the fluid flow outside the tube. This approach is not always effective in stopping leakage as the tube and tubesheet are in mechanical contact; further operation of the steam generator exposes the joint to thermal cycles which loosen the seal. The success of this method depends upon possible corrosion of the tubesheet and/or the absence of debris in the tubesheet-tube crevice, either condition would destroy the leak tightness sought.

All known prior art methods of sealing a defective tube, whether by expansion of tubes to tubesheets, or brazing or welding sleeves to the tube have taken place along the tube at an area away from the defect. Expansion of tubes to tubesheets and sleeves isolate the defective areas of the tube from the fluid flow of either without or within the tube. And in the case of sleeving, the sleeve must be able to withstand the loading forces which acted upon the original tube since the sleeve actually becomes the fluid conduit in the cases where corrosion is in its advanced stages. Sleeves of this type severely limit the fluid flow area within the repaired tube thereby reducing the efficiency of the steam generator.

The present invention avoids the disadvantages of the prior art by employing a method of sealing or patching the cracks in steam generator tubes within the tube sheet areas. This method employs the use of an explosive welding device in order to create a metallurgical bond atop the degraded area of the tube. The sleeve is welded to the inside wall of the tube along the entire length of the sleeve. The thickness size of the sleeve is such that it does not restrict the fluid flow area within the tube as do normal sleeving techniques.

BRIEF DESCRIPTION OF THE DRAWINGS

FIG. 3 is a side elevational view of a defective steam generator tube and placement of the mini-sleeve using an explosive welding device.

DESCRIPTION OF THE PREFERRED EMBODIMENT OF THE INVENTION

Figure 1:
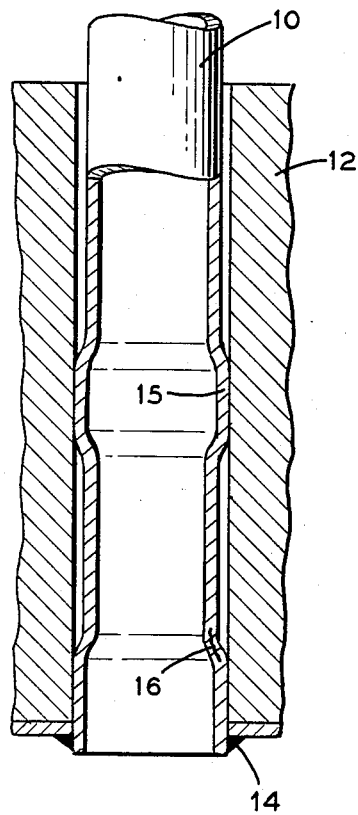
FIG. 1 is a side elevational view of a defective steam generator tube repaired by expansion.
Figure 2:
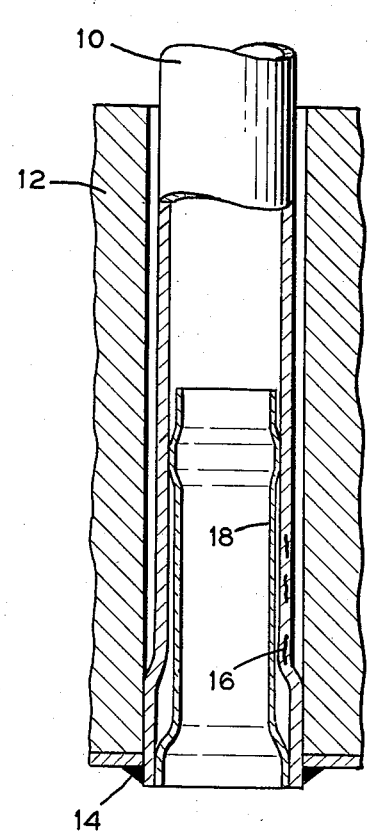
FIG. 2 is a side elevational view of a defective steam generator tube repaired by normal sleeving techniques.

In FIGS. 1 to 3 is illustrated the type and general location of the typical crack or leak to be sealed by the method and sleeve of the present invention. Shown is defective tube 10 within tubesheet 12. As per standard procedure, the tube 10 has been expanded into contact with the tubesheet 12 and the end 14 welded thereto. Experience has shown that stress corrosion cracks 16 occur in the area of the tube 10 where roll expansion has occurred; that area where the tube diameter increases or decreases and comes into contact with the tubesheet 12. Prior art methods of isolating these cracks are shown in FIGS. 1 and 2. FIG. 1 illustrates the technique which consists of expanding the tube 10 into the tubesheet 12 between the cracked area and the fluid outside the tube. This method provides metal to metal contact with the objective of stopping the leakage flow by isolating the fluid within the tube from the fluid without the tube. The tube 10 can be either hydraulically, mechanically or explosively expanded (not mutually exclusion) into contact with the tubesheet 12. FIG. 2 illustrates the second technique of isolating the crack from the fluid flow within the tube 10 by sleeving. A sleeve 18 of length greater than the degraded area and of a diameter less than the diameter of the defective tube 10 is positioned within tube. The two ends of the sleeve 18 are then either expanded, brazed or welded to the non-defective regions of tube.

The preferred method of repairing the leaks in steam generator tubes is illustrated in FIG. 3. As shown, an explosive welding device 20 is inserted into the defective tube 10. Welding device 20 is comprised of a front cup member 22 which is constructed of a plastic material of sufficient brittleness to shatter into small fragments when the device 20 is exploded. Within cup member 22 is an explosive material 24. In contact with one end of the explosive material 24 is an electric detonator 26 having wires 28 extending therefrom. The wires 28 are connected to a firing box (not shown) which is located in an area remote from the steam generator tube to be repaired. The explosive material 24 of the device is sealed with adhesive into the plastic cup member 22 thereby making the device resistant to moisture and water proof for possible underwater use. A centering device 30 is attached to the front of cup member 22 to insure that the welding device 20 is axially aligned within tube 10 assure minimum stand off or explosive welding and to hold the sleeve 50 in place.

The back end of the explosive device 20 is composed of a plug 32. The plug 32 consists of front and rear portions 34 and 36 respectively. The leading edge of the plug is of slightly smaller diameter than the remainder of the front portion 34 in order that the lip of the cup member 22 can be tightly fitted over the plug 32. Within the central portion of the front end 34 of plug 32 is detonator bore. The detonator bore is of such a size to allow the detonator 26 to snuggly fit therein. When the cup member 22 and plug 32 are joined, the detonator 26 is in contact with the explosive material 24.

The real portion 36 of the plug is comprised of four collapsible members 38. The collapsing members 38 are of a ductile, strong plastic material shaped in such a manner that they will collapse to a diameter smaller than the inner diameter of the tube 10 to be repaired. The collapsed members 38 apply a spring force against the inner diameter of the tube 10 so that it will remain securely positioned when inserted into a tube of a vertical tubed steam generator. The collapsable members 38 have an initial flat portion 40 which turns into a gradual taper 42 to a second flat area 44. A flange portion 46, which acts as an insertion stop for the device 20, exists after the second flat section 44 and terminates in a recess 48 which has been designed for use for remote tool handling. During insertion of the device on the tooling, the device is pushed into the direction A into the tool holder (not shown). The tool holder is cylindrical with a lip which mates with the recess 48. Interference of the tapered leading edge of the device 62, as it comes in contact with the lip on the tool holder causes the collapsable member 38 to move toward the center of the device. When the lip of the tool holder moves into alignment with the recess 48, the collapsable members 38 return to the original position and the device is securely positioned on the tool holder, which is either manual or automatic tooling. The tool is then positioned to insert the device 20 into the tube 10 to be repaired. During insertion into the tube, the gradual taper 42 comes into interference with the tube 10. Continued insertion collapses the members 38 which automatically releases the device from the tool holder. When the device is in the tube and released from the tool holder, the collapsable members 38 exert a spring force, at the second flat portion 44 against the inside of the tube 10 as shown in FIG. 3 by Arrows B. It is this force which is capable of supporting and retaining the explosive device 20 at the designated position, either in a horizontal or vertical tube, until the damaged tube is repaired.

The front cup member is constructed of a plastic material of sufficient brittleness to shatter into small fragments when the device is exploded. Acrylic plastics, such as melamine formaldehyde, urea formaldehyde or methyl methacrylate, are satisfactory. Strong ductile plastic cups are not satisfactory as they do not shatter and would therefore become wedged in the tube. The explosive material 24, for example nitrostarch, nitroguanidine, amatol or pentolite, is packed into the cup with a force adequate to produce a desired density of 0.35–0.7 gm/cc. A small amount of RDX (cyclotrimethylemetrinitramins), PETN (pentadrythrictol tetranitrate) or TATOC (tetranitrodibenzo-1, tetra-azpentalena) is packed on top of the explosive material 24 to serve as a booster. A thin coat of adhesive is applied to the lip of the cup member 22 and to the outside of the leading edge of plug 32. The plug 32 with the detonator 26 already fix thereto, is inserted into the cup member 22. The plug member 32 is constructed of a acetal resin, such as Delrin (a trademark of the Dupont DeNemours EI & Co.), nylon or polyethalene.

The front section of the plug can be of varied length in order to adjust the final position of the explosive cartridge and weld area within the tube. It is also understood by those skilled in the art that the back end of the plug can be composed of, for example, one rigid member and one collapsable member as detailed above. The collapsable member would unilaterally supply the spring force to support the device in a desired position. The use of the four identical members along with the locating member 30 ensures that the device 20 will be properly positioned within the defective tube even though all operations are carried out with remote tooling.

In the preferred method of the present invention the welding device 20 is remotely inserted into the end of defective tube 10. Premounted to the cup member 22 is a cylindrical sleeve 50 to be welded over the crack 16. As shown in FIG. 3 the axial length sleeve 50 is sized to approximate the length of the cup member 22. A recess can be machined in the cup 22 so that the sleeve 50 can be mounted therein. The recess is sized such that the sleeve 50 would be flush with the diameter of the cup 22. The sleeve 50 is thin walled, about 0.010 to 0.040 inches (0.0254 to 0.1016 cm) and generally about 1.5 to 4.0 inches (3.81 to 10.16 cm) long. The leading edge of the sleeve can be tapered in order to provide a smoother fluid flow transition section. Once inserted and positioned the remote tooling is removed and the device is detonated in order to effect the welding of the sleve 50 to the inner wall of defective tube 10. This procedure can thereafter be repeated for each defective tube. It is also envisioned that several devices can be inserted at one time and simultaneously detonated.

In most cases, due to a build up of oxides and other material within the defective tube, it will be advantageous to clean the inside of the tube before welding the sleeve thereto. Cleaning of the tube can be accomplished remotely by methods well known in the art.

While in accordance with the provisions of the status there is illustrated and described herein a specific embodiment of the invention, those skilled in the art will understand that changes may be made in the form of the invention covered by the claims, and that certain features of the invention may sometimes be used to advantage without a corresponding use of the other features:

What is claimed is:

1. A method of rapidly repairing a steam generator tube having a defect in the tube in a location encompassed by a tube sheet, comprising the steps of:

cleaning the inside surface of the defective tube;

positioning an explosive welding device on remotely operated tooling;

mounting a thin metallic cylindrical sleeve on the explosive device;

inserting the explosive device with the thin sleeve within the tube using the remotely operated tooling;

positioning the explosive device with the thin sleeve over the area containing the defect using the remotely operated tooling;

releasing the explosive device with the thin sleeve from the remotely operated tooling and removing the tooling; and detonating the device to explosively weld the entire surface area of the sleeve to said tube.

2. The method according to claim 1 wherein the cylindrical sleeve has a wall thickness of about 0.01 to 0.04 inches and a length of about 1.5 to 4.0 inches.

* * * * *